US011990628B2

(12) United States Patent
Sakurai

(10) Patent No.: US 11,990,628 B2
(45) Date of Patent: May 21, 2024

(54) SECONDARY BATTERY

(71) Applicant: Prime Planet Energy & Solutions, Inc., Tokyo (JP)

(72) Inventor: Takahiro Sakurai, Nagoya (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 110 days.

(21) Appl. No.: 17/589,599

(22) Filed: Jan. 31, 2022

(65) Prior Publication Data

US 2022/0247017 A1 Aug. 4, 2022

(30) Foreign Application Priority Data

Feb. 4, 2021 (JP) .................................. 2021-016289

(51) Int. Cl.
*H01M 50/107* (2021.01)
*H01M 10/0587* (2010.01)
*H01M 50/119* (2021.01)

(52) U.S. Cl.
CPC ..... *H01M 50/107* (2021.01); *H01M 10/0587* (2013.01); *H01M 50/119* (2021.01)

(58) Field of Classification Search
CPC ............. H01M 50/107; H01M 50/119; H01M 10/0587
See application file for complete search history.

(56) References Cited

U.S. PATENT DOCUMENTS

| 2005/0031950 | A1* | 2/2005 | Maeda | H01M 10/345 |
| | | | | 429/218.2 |
| 2006/0244416 | A1* | 11/2006 | Yong | H01M 50/121 |
| | | | | 320/112 |
| 2007/0020517 | A1* | 1/2007 | Chun | H01M 10/0431 |
| | | | | 429/174 |
| 2012/0060361 | A1* | 3/2012 | Reis | H01M 50/129 |
| | | | | 29/623.5 |
| 2013/0309533 | A1* | 11/2013 | Nakamura | H01G 11/26 |
| | | | | 429/94 |
| 2014/0087223 | A1 | 3/2014 | Hamakawa et al. | |
| 2017/0237045 | A1 | 8/2017 | Kim et al. | |

FOREIGN PATENT DOCUMENTS

| CN | 103682452 A | 3/2014 |
| JP | H2-121736 A | 5/1990 |
| JP | H11-96979 A | 4/1999 |
| JP | 2000-274978 A | 10/2000 |

(Continued)

OTHER PUBLICATIONS

JP 2012038603 MT (Year: 2012).*
Cylinder definition (Year: 1869).*
JP 2015103308 MT (Year: 2015).*

*Primary Examiner* — Alexander Usyatinsky
(74) *Attorney, Agent, or Firm* — HAUPTMAN HAM, LLP

(57) ABSTRACT

A secondary battery herein disclosed includes a case main body. The case main body accommodates a power generating element in the inside. The case main body includes a first member and a second member. The first member is bottomed cylindrical and formed from one metal plate by a drawing process. The shape of the second member is cylindrical. The second member is joined in a state fitting the second member to a cylindrical portion of the first member.

4 Claims, 3 Drawing Sheets

(56) References Cited

FOREIGN PATENT DOCUMENTS

| | | | | |
|---|---|---|---|---|
| JP | 2004122592 | A | | 4/2004 |
| JP | 2008532223 | A | | 8/2008 |
| JP | 2012-38603 | A | | 2/2012 |
| JP | 2012038603 | | * | 2/2012 |
| JP | 2012-174532 | A | | 9/2012 |
| JP | 2013-239376 | A | | 11/2013 |
| JP | 2015103308 | A | * | 6/2015 |
| JP | 2015103308 | | * | 6/2016 |
| JP | 2017-107719 | A | | 6/2017 |
| JP | 2017532715 | A | | 11/2017 |
| JP | 2018-55893 | A | | 4/2018 |

\* cited by examiner

SECONDARY BATTERY

CROSS-REFERENCE TO RELATED APPLICATIONS

The present application claims the priority based on Japanese Patent Application No. 2021-016289 filed on Feb. 4, 2021, the entire contents of which are incorporated in the present specification by reference.

BACKGROUND OF THE INVENTION

1. Field of the Invention

The present teaching relates to a secondary battery including a power generating element accommodated inside a battery case having rigidity.

2. Description of the Related Art

A secondary battery has been widely used as a portable power supply for a personal computer, a portable terminal, or the like, or used as a power supply for driving automobiles, such as EV (electric vehicle), HEV (hybrid electric vehicle), and PHEV (plug-in hybrid electric vehicle). A laminate type battery case having flexibility, a rectangular cylindrical or circular cylindrical battery case having rigidity or the like has been known as the battery case of the secondary battery. The battery case having rigidity includes advantages, for example, in having the high resistance to the impact from the outside, in being hardly damaged by the needle-shaped member, and the like.

For example, Japanese Patent Application Publication No. 2017-532715 describes a secondary battery in which two members having the same shape and having the rigidity are joined by the laser welding to each other in a state arranging these two members opposed to each other so as to form a bottomed cylindrical or just cylindrical case member having an opening. A lid member (cap plate) is joined to the formed opening of the case member so as to seal the opening.

SUMMARY

Regarding the secondary battery described in the above-described cited document, unless seams of the members configuring the case member are joined firmly with no gaps, a malfunction, such as leakage of the electrolyte, would occur. However, regarding the technique described in the above-described cited document, it is quite difficult to firmly join the seams with no gaps by the laser welding in a state where end parts of plural members are opposed accurately to each other.

In addition, a drawing process (deep drawing process) is known as a method for forming a bottomed cylindrical member. In the drawing process, one metal plate is drawn with pressure so as to form the bottomed cylindrical member. Accordingly, the member formed by the drawing process includes no seams and thus a problem, such as reduction in the join strength, would occur hardly. However, in the drawing process, portions (non-use portion), which cannot be used as the battery case and thus would be scrapped or the like, among the material of the metal plate would occur often. If it is tried to make the depth of the formed bottomed cylindrical member be greater, the rate of non-use portions to the material of the metal plate becomes higher. Accordingly, it has been difficult for the conventional drawing process to efficiently form the bottomed cylindrical battery case having a sufficient depth capable of accommodating the power generating elements of the secondary battery.

It is a typical object of the present teaching to provide a secondary battery including a battery case formed efficiently and properly.

A secondary battery of one aspect herein disclosed includes a bottomed cylindrical case main body that accommodates a power generating element inside the bottomed cylindrical case main body. The case main body includes a bottomed cylindrical first member formed from one metal plate by a drawing process and includes a cylindrical second member. The second member is joined in a state fitting the second member to a cylindrical portion of the first member.

Regarding the secondary battery herein disclosed, the second member being cylindrical is joined to the bottomed cylindrical first member formed by the drawing process, so as to form the bottomed cylindrical case main body. In other words, the cylindrical second member is joined to the first member, regardless of the depth of the first member being bottomed cylindrical, so as to sufficiently secure the depth of the whole bottomed cylindrical case main body. Accordingly, making the depth of the first member be lesser can reduce the rate of the non-use portion to the material of the metal plate when the first member is formed by the drawing process. Further, the cylindrical second member is joined in a state fitting the cylindrical second member to the cylindrical portion of the first member. Accordingly, it facilitates firmly joining the first member and the second member with no gaps, in comparison with the case where end parts of two members are joined to each other in a state simply bringing the end parts into contact with each other. Thus, it is possible that the battery case of the secondary battery in accordance with the present disclosure is formed efficiently and firmly.

Incidentally, the term "bottomed cylindrical" merely represents the shapes of the first member and the case main body, and thus does not restrict the directions of the first member and the case main body. In other words, it is not necessary to arrange the bottom parts of the first member and the case main body at the bottom part of the secondary battery, and thus the bottom parts of the first member and the case main body might be arranged at the top part, the side part, or the like of the secondary battery.

In accordance with one effective aspect of the secondary battery herein disclosed, the second member is formed by the extruding process to have a cylindrical shape that is continuously extending with no seams. In this case, the second member is cylindrical and no seams are formed at the ring-shaped opposite ends of the second member. Accordingly, it does not happen that, when a lid member is joined to the open end of the second member, the join strength of the lid member is reduced by the seams, which is different from, for example, the case where a metal plate is deformed to have a ring-shape and is joined so as to use the second member. Thus, the strength of the battery case can be secured further properly.

In accordance with one effective aspect of the secondary battery herein disclosed, the second member is joined by the ultrasonic join process in a state fitting the second member to the cylindrical portion of the first member. In this case, it is rare that leak, or the like occurring at the join process reduces the battery performance, which is different from the case where the first member and the second member are joined by the laser welding. In addition, the ultrasonic join process is performed in a state pressing the fit portions of the first member and the second member, and thus it is rare that a gap occurs on the join portion, in comparison with the case where the laser welding, or the like is used. Thus, the battery case can be formed efficiently and properly.

In accordance with one effective aspect of the secondary battery herein disclosed, the power generating element includes an electrolyte, and the cylindrical portion of the first member is fit to the outer circumferential part of the cylindrical second member. In this case, it is easy to make the capacity of the bottomed cylindrical first member be larger, in comparison with the case where the cylindrical portion of the first member is fit to the inside of the second member. Accordingly, arranging the first member at the bottom part of the secondary battery would facilitate properly accumulating the electrolyte at the bottom part of the first member.

In accordance with one effective aspect of the secondary battery herein disclosed, the power generating element includes a wound electrode body. The wound electrode body is formed by winding a sheet-shaped positive electrode and a sheet-shaped negative electrode through a separator. The wound electrode body includes a pair of R parts in which the wound positive electrode, the wound negative electrode, and the wound separator are bent. One of the pair of R parts of the wound electrode body is arranged at the position of the ring-shaped open end positioned at the opposite side to the bottom part of the first member or arranged at the position closer to the bottom part side than the open end. In this case, the depth of the bottomed cylindrical first member is secured to sufficiently fit the cylindrical portion of the first member to the second member. Therefore, it further facilitates securing the join strength of the first member to the second member.

DETAILED DESCRIPTION OF THE PREFERRED EMBODIMENTS

Below, one of typical embodiments in the present disclosure will be described in details by reference to the accompanying drawings. The matters other than matters particularly mentioned in this specification, and required for practicing the present invention can be grasped as design matters of those skilled in the art based on the related art in the present field. The present teaching can be executed based on the contents disclosed in the present specification, and the technical common sense in the present field. Incidentally, in the following accompanying drawings, the members/parts providing the same effect are given the same numerals and signs. Further, the dimensional relation (such as length, width, or thickness) in each drawing does not reflect the actual dimensional relation.

In the present specification, "battery" is a term denoting an electric storage device capable of extracting the electric energy in general, and is a concept including a primary battery and a secondary battery. The term "secondary battery" denotes an electric storage device capable of repeatedly charging and discharging in general, and includes a capacitor (i.e., a physical battery) such as an electric double layer capacitor other than a so-called storage battery such as a lithium ion secondary battery, a nickel hydrogen battery, or a nickel cadmium battery (i.e., a chemical battery). The term "cylindrical" includes "rectangular cylindrical" and "circular cylindrical". Below, by taking a flat square-shaped lithium ion secondary battery of one kind of a secondary battery as an example, a secondary battery in accordance with the present disclosure will be described in details. However, it is not intended that the secondary battery in accordance with the present disclosure is limited to those described in the following embodiments.

Figure 1:
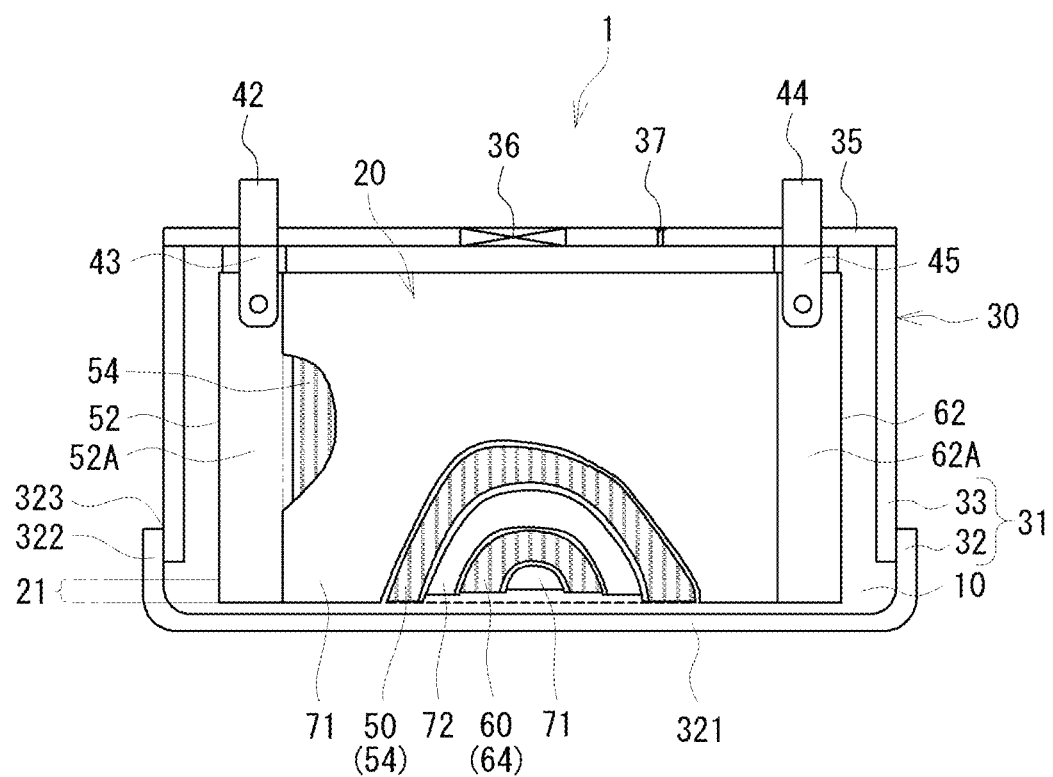
FIG. 1 is a cross sectional view schematically showing a configuration of a secondary battery 1 in accordance with one embodiment.

<Configuration of Secondary Battery> A secondary battery 1 shown in FIG. 1 is a sealed type lithium ion secondary battery that includes an electrode body 20, an electrolyte (nonaqueous electrolyte in the present embodiment) 10, and a battery case 30. The electrode body 20 and the electrolyte are power generating elements of the secondary battery 1. The battery case 30 accommodates the electrode body 20 and the electrolyte 10 in a state enclosing them in the inside. The shape of the battery case 30 in the present embodiment has a flat rectangular cylindrical shape. However, the shape of the battery case 30 might be the other shape (e.g., circular cylindrical shape, or the like).

The battery case 30 includes a bottomed rectangular cylindrical case main body 31 that has an opening at the one end (top end in the present embodiment), and includes a plate-shaped lid member 35 that blocks the opening of the main body. The detailed configuration of the case main body 31 is described later. The battery case 30 (particularly, the lid member 35 of the battery case 30) is provided with a positive electrode outside terminal 42 for the outside connection, a negative electrode outside terminal 44 for the outside connection, and a safety valve 36. When the internal pressure of the battery case 30 increases to be equal to or more than a predetermined level, the safety valve 36 releases the internal pressure. In addition, the battery case 30 is provided with an injection port 37 for injecting the electrolyte 10 into the inside. The material of the battery case 30 is preferred to be lightweight, to have good thermal conductivity, and to have appropriate rigidity. As one example, aluminum is used for the material of the battery case 30 in the present embodiment.

The electrode body 20 in the present embodiment includes a long positive electrode (positive electrode sheet) 50, a long first separator 71, a long negative electrode (negative electrode sheet) 60, and a long second separator 72, which are stacked one on another and then wound. In other words, the electrode body 20 in the present embodiment is a wound electrode body formed by winding the positive electrode 50 and the negative electrode 60 through the first separator 71 and the second separator 72.

Figure 2:
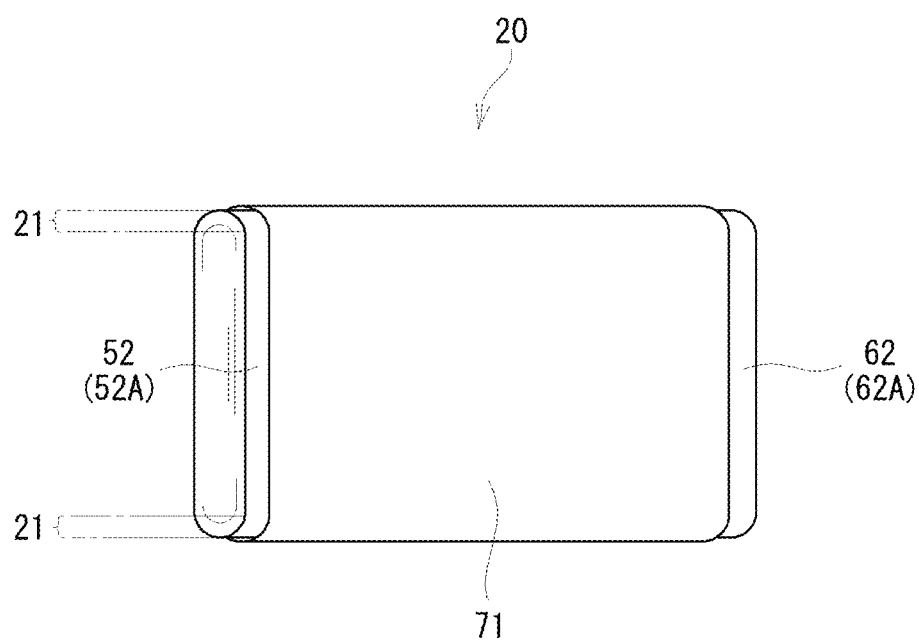
FIG. 2 is a perspective view of an electrode body 20.

As shown in FIG. 2, the electrode body 20 in the present embodiment includes a pair of R parts 21, one of R parts 21 is formed at the top end part and the other one of R parts 21 is formed at the bottom end part. The R part 21 represents a portion where the wound positive electrode 50, the wound first separator 71, the wound negative electrode 60, and the wound second separator 72 are bent. In addition, for accommodating the electrode body 20 in the case main body 31 (see FIG. 1), the vertical direction central part of the electrode body 20 is formed to have a flat shape.

As shown in FIG. 1, the positive electrode 50 includes a long positive electrode collector 52, and one surface or both surfaces of the positive electrode collector 52 (both surfaces in the present embodiment) are coated with positive electrode active material layers 54 along the longitudinal direction. The negative electrode 60 includes a long negative electrode collector 62, and one surface or both surfaces (both surfaces in the present embodiment) of the negative electrode collector 62 are coated with negative electrode active material layers 64 along the longitudinal direction. Non-coating parts 52A, 62A are respectively arranged at the opposite ends in the winding axis direction of the electrode body 20. The non-coating part 52A represents a portion where the positive electrode collector 52 is exposed and is not coated with the positive electrode active material layer 54. The non-coating part 52A is joined with the positive electrode collector terminal 43. The positive electrode collector terminal 43 is electrically connected to the positive electrode outside terminal 42. In addition, the non-coating part 62A represents a portion where the negative electrode collector 62 is exposed and is not coated with the negative electrode active material layer 64. The non-coating part 62A is joined with the negative electrode collector terminal 45. The negative electrode collector terminal 45 is electrically connected to the negative electrode outside terminal 44. It is possible without restriction to use materials similar to the materials used for a conventional and general secondary battery, as the materials configuring the positive and negative electrodes and the separator of the electrode body 20 and the material configuring the electrolyte 10 of the electrode body 20.

Figure 3:
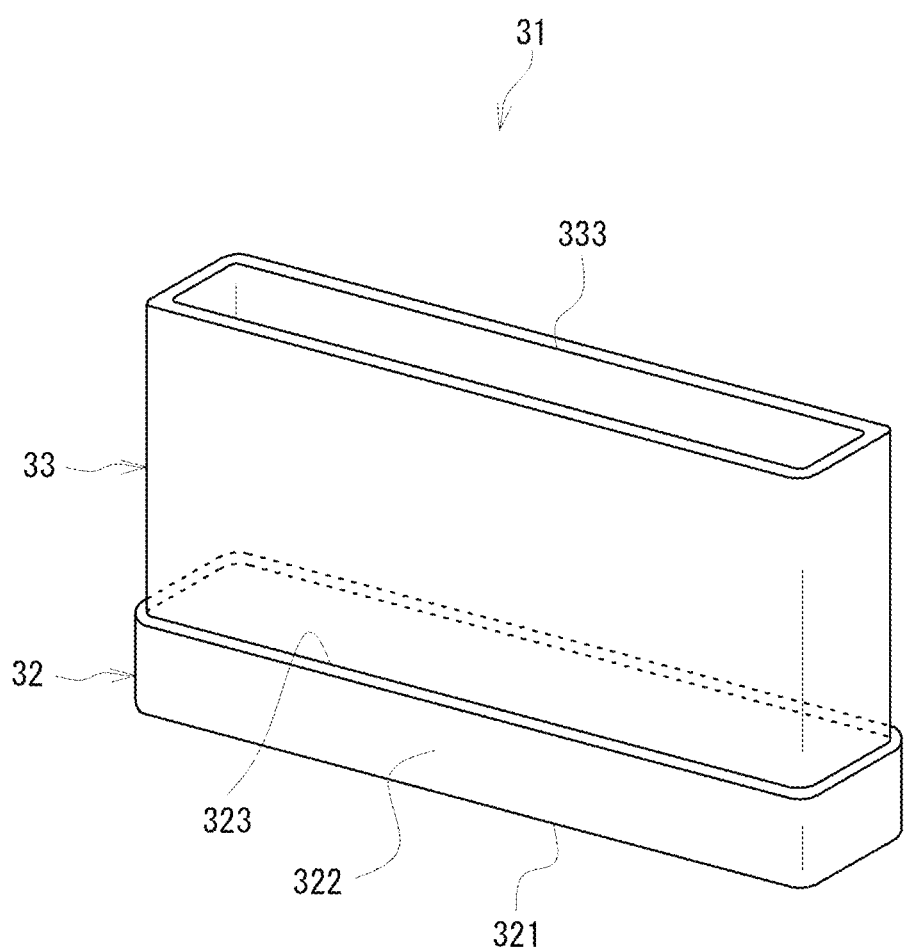
FIG. 3 is a perspective view of a case main body 31.

<Case Main Body> Referring to FIG. 1 and FIG. 3, the case main body 31 included by the battery case 30 is described in details. As described above, the case main body 31 is formed to be bottomed cylindrical. Inside the case main body 31, the electrode body 20 and the electrolyte 10 (see FIG. 1), which are the power generating elements, are accommodated. Incidentally, in the present embodiment, the bottom part (a bottom part 321 of a first member 32 described later) of the case main body 31 is arranged at the bottom part of the secondary battery 1. However, the bottom part of the case main body 31 might be arranged at a position different from the bottom part of the secondary battery 1. In other words, the term "bottomed cylindrical" merely represents the shape of the case main body 31, and does not restrict the direction of the case main body 31. The case main body 31 includes a first member 32 and a second member 33. Both of the first member 32 and the second member 33 have appropriate rigidity, and are formed with lightweight metal materials (aluminum in the present embodiment).

The first member 32 will be described. As shown in FIG. 3, the shape of the first member 32 is bottomed cylindrical. The first member 32 in the present embodiment includes a bottom part 321 and a cylindrical part 322. The bottom part 321 blocks a side opposite to the side of the opening blocked by the lid member 35 (see FIG. 1) in the case main body 31. The cylindrical part 322 extends in a cylindrical manner from the outer circumference of the bottom part 321. Accordingly, the end part (top end part in FIG. 3) at the side opposite to the side of the bottom part 321 in the cylindrical part 322 is a ring-shaped open end 323.

The first member 32 is formed by a drawing process (which might be referred to as a deep drawing process). The drawing process is a processing method, in which pressure is applied to one metal plate and the metal plate is drawn to form a member having a predetermined shape (bottomed cylindrical shape in the present embodiment). The first member 32 formed by the drawing process includes no seams formed by the join. Accordingly, it is possible to suppress the leakage of the electrolyte 10 from the seam of the first member 32, or the like.

The shape of the second member 33 is cylindrical. In the cylindrical second member 33, at least the shape of an outer circumferential part of the end part at the first member 32 side (bottom end part in the present embodiment) corresponds to (in the present embodiment, approximately coincide with) the shape of an inner peripheral part of the open end 323 of the cylindrical part 322 of the first member 32. Incidentally, in the second member 33, it is also possible that at least the shape of the inner peripheral part of the end part at the first member 32 side is made to correspond to the shape of the outer circumferential part of the open end 323 of the cylindrical part 322.

The rectangular cylindrical second member 33 is joined in a state fitting the second member 33 to the cylindrical part 322 of the first member 32 so as to form the bottomed cylindrical case main body 31. In other words, it is possible to sufficiently secure the whole depth of the bottomed cylindrical case main body 31 (distance from the bottom part 321 to the opening 333 at which the lid member 35 is joined in the present embodiment (see FIG. 3)), regardless of the depth of the first member 32 being bottomed cylindrical, by joining the cylindrical second member 33 with the first member 32. Accordingly, making the depth of the first member 32 be lesser can reduce the rate of the non-use portion of the material of the metal plate when the first member 32 is formed by the drawing process.

In addition, the cylindrical second member 33 is joined in a state fitting the second member 33 to the cylindrical part 322 of the first member 32. Accordingly, it facilitates firmly joining the first member 32 to the second member 33 with no gaps in comparison with the case where both members are joined in a state merely bringing the end part (top end part in the present embodiment) of the cylindrical part 322 in the first member 32 into contact with the end part (bottom end part in the present embodiment) of the second member 33.

The cylindrical second member 33 is formed by an extruding process to have a continuous cylindrical shape with no seams. Accordingly, no seams caused by the join are formed at the opening 333 joined with the lid member 35 (see FIG. 1) in the second member 33. Thus, when the lid member 35 is joined to the opening 333 of the second member 33, no reduction in the join strength caused by the seam occurs. However, in the case where the join strength of the lid member 35 to the opening is hardly reduced or the like, a plate-shaped member might be deformed to have a ring-shape so as to join the opposite ends, and thus so as to form the cylindrical second member.

The second member 33 is joined by the ultrasonic join process in a state fitting the second member 33 to the cylindrical part 322 of the first member 32. Accordingly, reduction in the battery performance or the like caused by leak or the like occurring at the time of join would hardly occur, which is different from the case where the first member 32 and the second member 33 are joined by the laser welding or the like. In addition, the ultrasonic join process is performed to process the fit portions of the first member 32 and the second member 33 with an ultrasonic horn and an anvil (receiving jig), in a state arranging one among the ultrasonic horn and the anvil inside the case main body 31 and arranging the other one among the ultrasonic horn and the anvil outside the case main body 31. Accordingly, the possibility of causing the gap at the join portions of the first member 32 and the second member 33 is further reduced. Incidentally, at the portion, in which the members are bent, in the fit portions of the first member 32 and the second member 33, the ultrasonic join process is performed in a state arranging an anvil that matches the bent shape. Thus, the portion, in which the members are bent, is also properly joined.

As described above, at least the shape of the outer circumferential part of the end part (bottom end part in the present embodiment) at the first member 32 side in the cylindrical second member 33 corresponds to the shape of the inner peripheral part of the open end 323 in the cylindrical part 322 of the first member 32. As a result, the cylindrical part 322 of the first member 32 fits to the outer circumferential part of the second member 33. Accordingly, it facilitates making the capacity of the bottomed cylindrical first member 32 become larger, in comparison with the case where the outer circumferential part of the cylindrical part 322 of the first member 32 is fit to the inner peripheral part of the second member 33. Accordingly, it facilitates properly accumulating the electrolyte 10 in the first member 32. However, in the case where the effect of facilitating the accumulation of the electrolyte 10 or the like is not enough, the first member 32 and the second member 33 might be joined in a state fitting the outer circumferential part of the cylindrical part 322 of the first member 32 to the inner peripheral part of the second member 33.

As shown in FIG. 2, the electrode body 20 in the present embodiment is provided with the pair of R parts 21 in which wound electrodes and the like are bent, and the R parts 21 are respectively formed at the pair of opposed end parts (top and bottom end parts in the present embodiment). As shown in FIG. 1, one of the pair of R parts 21 (downward R part 21 in the present embodiment) of the electrode body 20 is arranged at the position of the ring-shaped open end 323 positioned at the side opposite to the bottom part 321 of the first member 32, or arranged at the position closer to the bottom part 321 side than the open end 323. Accordingly, the depth of the bottomed cylindrical first member 32 is secured to sufficiently fit the cylindrical part 322 of the first member 32 to the second member 33. Therefore, it further facilitates securing the join strength of the first member 32 and the second member 33.

Up to this point, a detailed description has been given by way of specific embodiments, which are merely illustrative, and is not construed as limiting the scope of the appended claims. The technology according to the appended claims includes various modifications and changes of the embodiments described up to this point.

What is claimed is:

1. A secondary battery comprising a bottomed cylindrical case main body that accommodates a power generating element inside of the bottomed cylindrical case main body, wherein
the case main body comprises:
a bottomed cylindrical first member formed from one metal plate by a drawing process; and
a cylindrical second member, and
the second member is joined in a state fitting the second member to a cylindrical portion of the first member with no gaps, wherein
the power generating element comprises an electrolyte, and
the cylindrical portion of the first member directly contacts an outer circumferential part of the second member being cylindrical.

2. The secondary battery according to claim 1, wherein the second member is formed to have a continuous cylindrical shape with no seams by an extruding process.

3. The secondary battery according to claim 1, wherein the second member is joined by an ultrasonic join process in the state fitting the second member to the cylindrical portion of the first member.

4. The secondary battery according to claim 1, wherein the power generating element comprises a wound electrode body,
the wound electrode body is formed by winding a sheet-shaped positive electrode and a sheet-shaped negative electrode through a separator, and comprises a pair of R parts,
each of the R parts is a portion where the positive electrode being wound, the negative electrode being would, and the separator being wound are bent, and
one of the pair of R parts in the wound electrode body is arranged at a position of a ring-shaped open end positioned at a side opposite to a bottom part of the first member, or arranged at a position closer to a side of the bottom part than the open end.

* * * * *